United States Patent Office 2,970,939
Patented Feb. 7, 1961

2,970,939
CONTROL OF NEMATODES EMPLOYING N-NITROSO-N,N-DIMETHYLAMINE

Eldon Gene Maitlen, Middleport, N.Y., assignor to Food Machinery and Chemical Corporation, New York, N.Y., a corporation of Delaware No Drawing. Filed Sept. 5, 1958, Ser. No. 759,150

4 Claims. (Cl. 167—22)

This invention relates to a new nematocide. More particularly, this invention relates to the use of the compound N-nitroso-N,N-dimethylamine as a nematocide.

Nematodes are roundworms which live in soil or water. Many are parasitic on animals or plants. Most of the species which are important as plant pathogens are within the superfamily Dorylaimoidea and the order Tylenchida (Goodey, 1951) belonging to the class Nematoda and phylum Nemathelminthes. These are pests on agricultural or other economically important plants, and may attack the roots, stems, leaves or ears of these plants, resulting in the deterioration or destruction of a crop. These pests cause severe damage to crops and millions of dollars are lost each year due to the destruction of the crops by these pests. There has thus existed for a long time the need for a particularly effective nematocide which may be applied both to the pre-emergent and to the post-emergent crop plant. When applied as a pre-emergent nematocide, the compound should be capable of penetrating deeply into the soil and killing the nematodes found therein without injury to the desired plant life. Furthermore such nematocide should be capable of exerting a long-residual effect upon the soil so as to obviate the necessity and expense of repeated applications. When the nematocide is applied to the post-emergent plant, in addition to having the above-mentioned characteristics, it should also be non-toxic to the particular growing plant. Hereinafter the term plant life will include all stages of plant growth including seed, seedling, etc.

N-nitroso-N,N-dimethylamine has the following formula

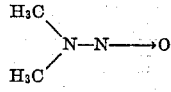

and is prepared by reacting dimethylamine with nitrous acid.

This compound is particularly advantageous since it is capable of acting through the soil profile, both as a gas and as a solution. Since N-nitroso-N,N-dimethylamine is soluble in all proportions in water, it can penetrate more easily and to greater depth than can compounds which act by fumigant action alone. Thus, this compound may be moved through the soil in a water phase by irrigation or natural rainfall. Furthermore, N-nitroso-N,N-dimethylamine reacts in the soil for a substantial period after treatment. This offers a prolonged interval for which nematode control may be achieved and allows for the treating of the soil sometime prior to planting. Moreover, this compound is selectively non-phytotoxic to many crop plants such as carrots, tobacco, cotton, etc., and can be applied directly to the soil prior to, at the time of, or after seeding or transplanting.

N-nitroso-N,N-dimethylamine may be applied directly in an aqueous solution to the soil. If desired, the compound may be applied in liquid compositions other than water. The preferred organic solvent carriers are those which aid in the penetration and impregnation of the soil with N-nitroso-N,N-dimethylamine and have such volatility that they leave a minimum residue such as xylene, toluene, isophorone, etc.

N-nitroso-N,N-dimethylamine may be employed as a dust. The active ingredient may be dispersed in and on a finely divided material such as chalk, talc, bentonite or fuller's earth. In such preparations, the finely divided carrier is mixed with or wet with the active ingredient or a volatile organic solution thereof. Granular carriers may be handled in a similar fashion. The granular or dust-type formulations may be applied on the soil or mixed into the soil using suitable known techniques.

The preferred method of application is by means of an aqueous solution which consists of from 0.4 to 8.0 weight percent active ingredient. The concentration, however, is not critical because dilute solutions as well as direct applications of pure material are successful. In general, the strength of the solution may be varied such that the resultant chemical mixture when drenched into the soil elicits economic control of the parasites and brings about the best distribution of the toxicant under the prevailing conditions.

The following examples are given by way of illustration and it is not intended that the invention be limited thereto since obvious deviations may be made by those skilled in the art which are within the spirit and scope of this invention.

*Example 1*

Twenty-one hundredths (0.21) ml. and eighty-four thousandths (0.084) ml. of N-nitroso-N,N-dimethylamine was added to 150 ml. of water which was slurried into 60 grams of oatmeal. Two replicates were included at each rate. These rates are equivalent to approximately 1,000 p.p.m. and 400 p.p.m. The resulting mixtures along with untreated controls were inoculated with 10 ml. of an aqueous suspension of the paste nematode, *Panagrellus redivivus* (Linn., 1767), Goodey, 1945. The dishes were incubated at a temperature of 70° F.

Six weeks after the chemical was applied, 10 drops of liquid from the surface of each culture was pipetted into 100 ml. of water. The sample was stirred vigorously and three two-drop sub-samples were collected and the number of living nematodes determined. The data obtained are presented in Table 1. The average of the three replicates is given.

TABLE 1

*Toxicity of N-nitroso-N,N-dimethylamine to Panagrellus redivivus*

| Rate, p.p.m. | Av. No. live nematodes/ml. |
|---|---|
| 0 | 2800 |
| 400 | 0 |
| 1000 | 0 |

It will be seen from the above data that the compound of this invention has significant nematocidal properties.

Example 2

N-nitroso-N,N-dimethylamine was employed for the treatment of a sandy loam soil heavily infested with the root-knot nematode, *Meloidogyne incognita*. This particular nematode incites distinct galls or knots on the roots of certain plants, and since tomatoes are susceptible to attack they were used as indicator plants. The degree of gall formation on the roots of the tomato was the basis for ascertaining nematode control. These tests were carried out in lacquer-lined tin cans which are 4 inches in diameter and 7 inches deep. The bottoms of the cans were perforated to permit drainage. The test soil was uniformly infected with the larval and egg stages of the root-knot nematode. The inoculation was carried out by mixing the soil in a twin-shell blender with a standard increment of chopped infested tomato root. The infested soil was placed in the described containers and treated with aqueous solutions of N-nitroso-N,N-dimethylamine. N-nitroso-N,N-dimethylamine in the following amounts was pipetted into 100 ml. samples of water: 0.2 ml., 0.15 ml., 0.1 ml., and 0.075 ml. These quantities of material when drenched into the test containers are equivalent to 200, 150, 100 and 75 pounds per acre, respectively. Three weeks after treatment, indicator plants (Bonny Best tomatoes, 6 inches high) were transplanted into the test cans which were then kept for thirty days in the greenhouse (temp. 65–80° F.). The plants were then removed from the cans, the roots washed free of adhering soil, and compared with the roots of similar plants grown in infested but untreated soil.

The rating system which was used is as follows:

0 = no galls present
1 − = very few galls, 99% control or better
1 = 1–25% galling of roots
2 = 26–50% galling of roots
3 = 51–75% galling of roots
4 = 76–100% galling of roots The results of this test are recorded in Table II. These data demonstrate that N-nitroso-N,N-dimethylamine is effective as a nematocide.

TABLE II

*The effect of N-nitroso-N,N-dimethylamine on the development of root-knot caused by a meloidogyne species*

| Rate/acre, lbs. | Knot index | Rate/acre, lbs. | Knot index |
|---|---|---|---|
| 200 | 0 | 100 | 1− |
| 200 | 1− | 100 | 1− |
| 200 | 1− | 100 | 1 |
| 200 | 1− | 100 | 1 |
| 150 | 1− | 75 | 1 |
| 150 | 1− | 75 | 1 |
| 150 | 1− | 75 | 1 |
| 150 | 1− | 75 | 1 |
| Checks: | | | |
| 0 | 4 | | |

Example 3

A series of cans as described under Example 2 were filled with a light sandy loam soil which contained no root-knot nematodes. The following amounts of N-nitroso-N,N-dimethylamine were then injected into these cans by means of a pipette; 0.43 ml./can, 0.26 ml./can, 0.17 ml./can, and 0.085 ml./can which are equivalent to 400 lbs., 250 lbs., 165 lbs., and 85 lbs., per acre, respectively. Immediately after injection each can was drenched with 100 ml. of water. These cans were maintained on a greenhouse bench for a period of thirty-one days at temperatures ranging from 65–80° F. At this time, the cans were uniformly inoculated with infected roots and indicator plants were transplanted into the cans in the same manner as described in Example 2. Twenty-three days after transplanting (fifty-four days after chemical application), the indicator plants were removed, the roots washed free of adhering soil, and compared with the roots of similar plants grown in infested but untreated soil.

The data obtained are presented in Table III and demonstrates the residual property of N-nitroso-N,N-dimethylamine in the soil.

TABLE III

*The residual properties of various dosages of N-nitroso-N,N-dimethylamine*

| Rate/acre, lbs. | Knot Index (54 days after chemical application) |
|---|---|
| 400 | 1− |
| 400 | 1− |
| 400 | 1− |
| 400 | 1 |
| 250 | 1− |
| 250 | 1− |
| 165 | 1 |
| 165 | 1 |
| 85 | 3 |
| 85 | 4 |
| Checks | 4 |

Example 4

This experiment demonstrates the relative non-phytotoxicity of N-nitroso-N,N-dimethylamine to a wide range of crop species. Sterile soil was placed into a series of metal pans which, in turn, were drenched with the following amounts of N-nitroso-N,N-dimethylamine: 0.77 ml., 0.38 ml., and 0.19 ml. These rates are equivalent to 100, 50 and 25 lbs./acre, respectively. The chemical was applied as an aqueous solution which consisted of a final total of 300 ml. On the third day after chemical application, the following crops were sown: lima beans, pea, tobacco, tomato, cotton, flax, carrots, cauliflower, and cabbage. Approximately three weeks after planting, the data presented as Table IV were procured.

TABLE IV

*Selective phytotoxicity of N-nitro-N,N-dimethylamine*

| Rate/Acre | Crop | Comments |
|---|---|---|
| 100 | Lima Beans | Some emergence occurred, but all plants were stunted. |
| 50 | do | |
| 25 | do | The growing point was killed, plants not expected to live. |
| 100 | Peas | Severe stunting. |
| 50 | do | Slight stunting. |
| 25 | do | No effect. |
| 100 | Flax | Complete kill. |
| 50 | do | 1–2% emergence, not expected to live. |
| 25 | do | 10% stand, poor vigor. |
| 100 | Carrots | Excellent vigor. |
| 50 | do | Look better than checks. |
| 25 | do | Do. |
| 100 | Tobacco | No effect. |
| 50 | do | Do. |
| 25 | do | Do. |
| 100 | Cotton | Do. |
| 50 | do | Do. |
| 25 | do | Do. |
| 100 | Cabbage | Do. |
| 50 | do | Do. |
| 25 | do | Do. |
| 100 | Cauliflower | Do. |
| 50 | do | Do. |
| 25 | do | Do. |
| 100 | Tomato | Possibly a slight stunting. |
| 50 | do | No effect. |
| 25 | do | Do. |

I claim:
1. A method of killing nematodes which comprises applying the compound N-nitroso-N,N-dimethylamine to nematode infested soil.
2. A method of killing nematodes which comprises applying the compound N-nitroso-N,N-dimethylamine to nematode infested pre-emergent plant life.
3. A method of killing nematodes which comprises applying the compound N-nitroso-N,N-dimethylamine to nematode infested post-emergent plant life.
4. A method of killing nematodes which comprises dissolving the compound N-nitroso-N,N-dimethylamine in water and applying said solution to nematode infested soil.

References Cited in the file of this patent

UNITED STATES PATENTS

| | | |
|---|---|---|
| 1,968,341 | Hartmann | July 31, 1934 |
| 2,166,150 | Howk | July 18, 1939 |
| 2,246,524 | Kyrides | June 24, 1941 |
| 2,267,204 | Kyrides | Dec. 23, 1941 |
| 2,381,408 | Senkus | Aug. 7, 1945 |
| 2,754,329 | Bashford | July 10, 1956 |

FOREIGN PATENTS

| | | |
|---|---|---|
| 772,331 | Great Britain | Apr. 10, 1957 |
| 553,623 | Canada | Sept. 24, 1955 |

UNITED STATES PATENT OFFICE
CERTIFICATION OF CORRECTION

February 7, 1961

Patent No. 2,970,939

Eldon Gene Maitlen

It is hereby certified that error appears in the above numbered patent requiring correction and that the said Letters Patent should read as corrected below.

Column 4, heading to TABLE IV, for "N-nitro-N,N-dimethylamine", in italics, read -- N-nitroso-N,N-dimethylamine --, in italics.

Signed and sealed this 20th day of June 1961.

(SEAL)
Attest:

ERNEST W. SWIDER
Attesting Officer

DAVID L. LADD
Commissioner of Patents